United States Patent [19]
Turner

[11] Patent Number: 5,561,687
[45] Date of Patent: *Oct. 1, 1996

[54] DECISION FEEDBACK EQUALIZER EMPLOYING FIXED RATIO POSTCURSOR TAPS FOR MINIMIZING NOISE AND INTERSYMBOL INTERFERENCE IN SIGNALS CONVEYED OVER HIGH SPEED DATA SERVICE LOOP

[75] Inventor: Michael D. Turner, Madison, Ala.

[73] Assignee: ADTRAN, Huntsville, Ala.

[*] Notice: The term of this patent shall not extend beyond the expiration date of Pat. No. 5,424,733.

[21] Appl. No.: 356,140

[22] Filed: Dec. 15, 1994

Related U.S. Application Data

[63] Continuation of Ser. No. 170,412, Dec. 20, 1993, Pat. No. 5,414,733.

[51] Int. Cl.$^6$ .................................................. H03H 7/30
[52] U.S. Cl. .................. 375/233; 364/724.16; 364/724.2
[58] Field of Search .................................. 375/232–234, 375/348, 350; 364/724.16, 724.19, 724.2; 333/18, 28 R

[56] References Cited

U.S. PATENT DOCUMENTS

| | | | |
|---|---|---|---|
| 4,631,735 | 12/1986 | Quresri | 375/254 |
| 4,789,994 | 12/1988 | Randall et al. | 375/233 |
| 5,031,194 | 7/1991 | Crespo et al. | 375/233 |
| 5,117,291 | 5/1992 | Fadavi-Ardekani et al. | 375/231 |
| 5,293,402 | 3/1994 | Crespo et al. | 375/233 |

*Primary Examiner*—Young T. Tse
*Attorney, Agent, or Firm*—Charles E. Wands

[57] ABSTRACT

The feedforward filter section of a decision feedback equalizer is modified to include one or more postcursor taps, that are sequentially weighted at decreasing binary fractions of the cursor tap. Such a modified feedforward filter section, combined with the placement of a simple anti-aliasing filter upstream of the sampling point, results in an optimum feedforward filter configuration that is not anticausal, and offers a substantially improved performance over conventional DFB equalizer structures. Optimum performance is achieved when such a postcursor filter structure is augmented with an adaptive noise canceler coupled in the DFB path.

10 Claims, 13 Drawing Sheets

RELATIVE FREQUENCY RESPONSE FOR WHITE NOISE INPUT:

RELATIVE FREQUENCY RESPONSE FOR SHAPED NOISE INPUT (NEXT):

"NEXT" PSD AND OUTPUT SPECTRUM OF FIR DRIVEN BY NEXT INPUT:

"NEXT" SPECTRUM AFTER FIR WITH ONE POSTCURSOR TAP:

"NEXT" SPECTRUM AFTER FIR WITH FOUR POSTCURSOR TAPS:

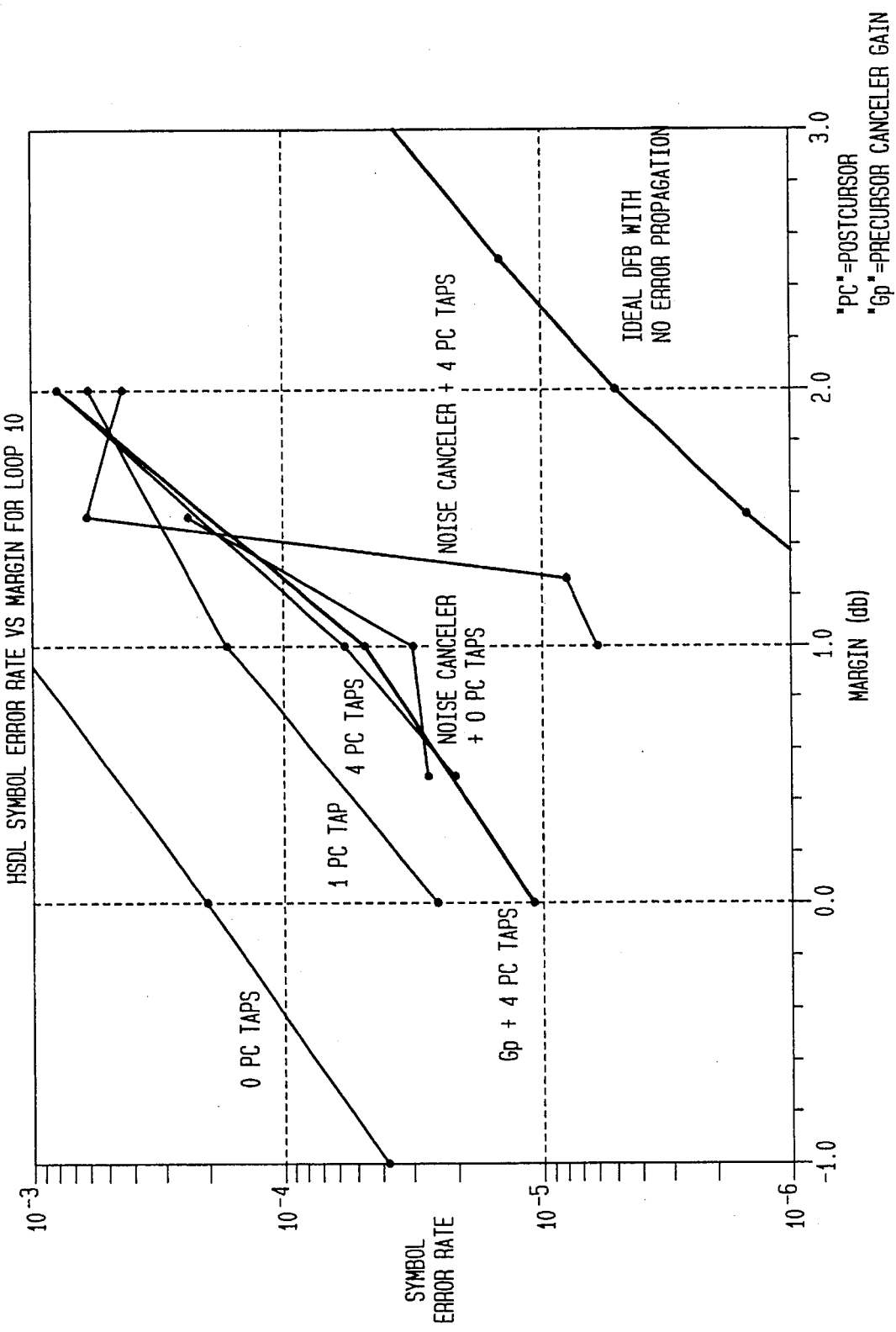

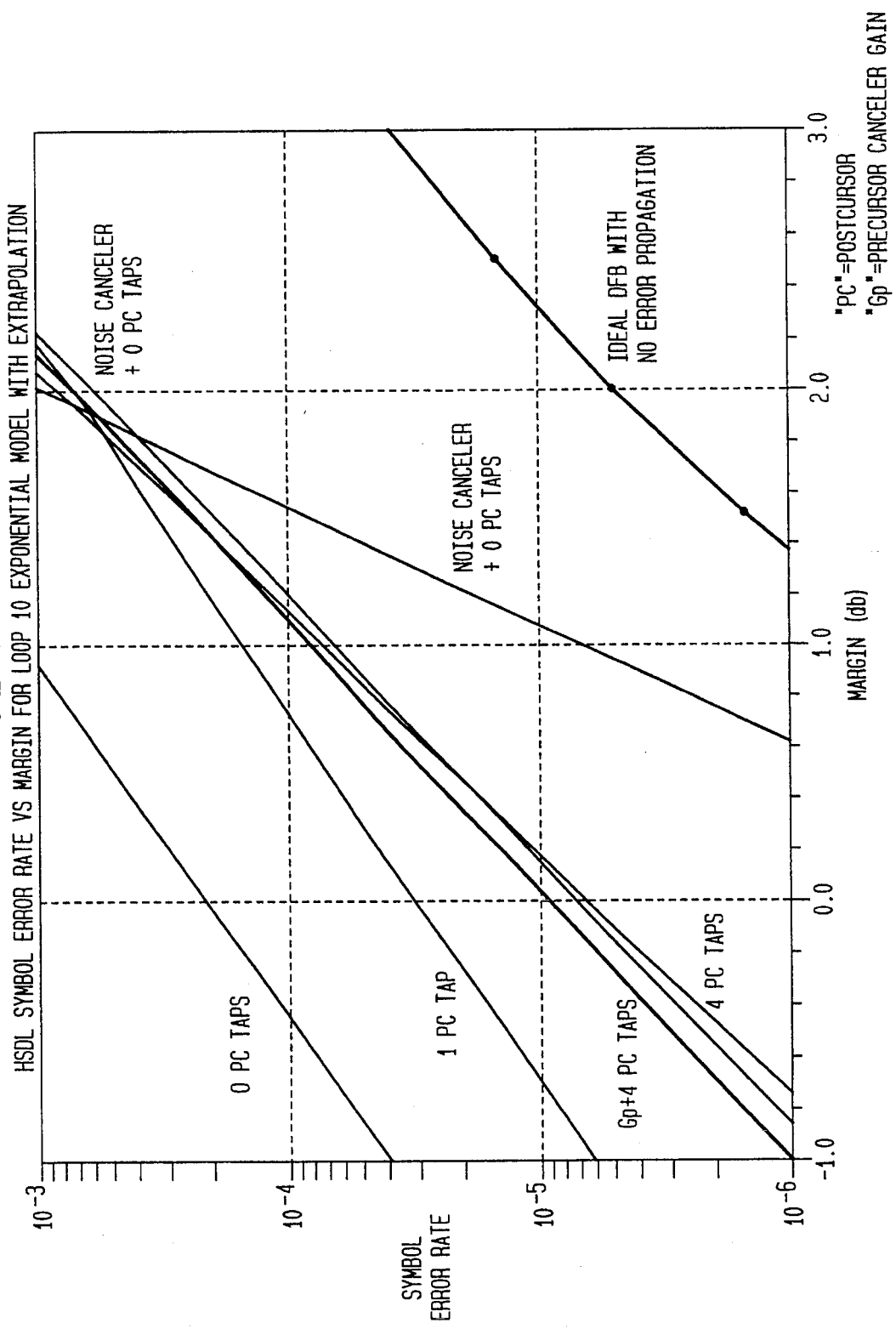

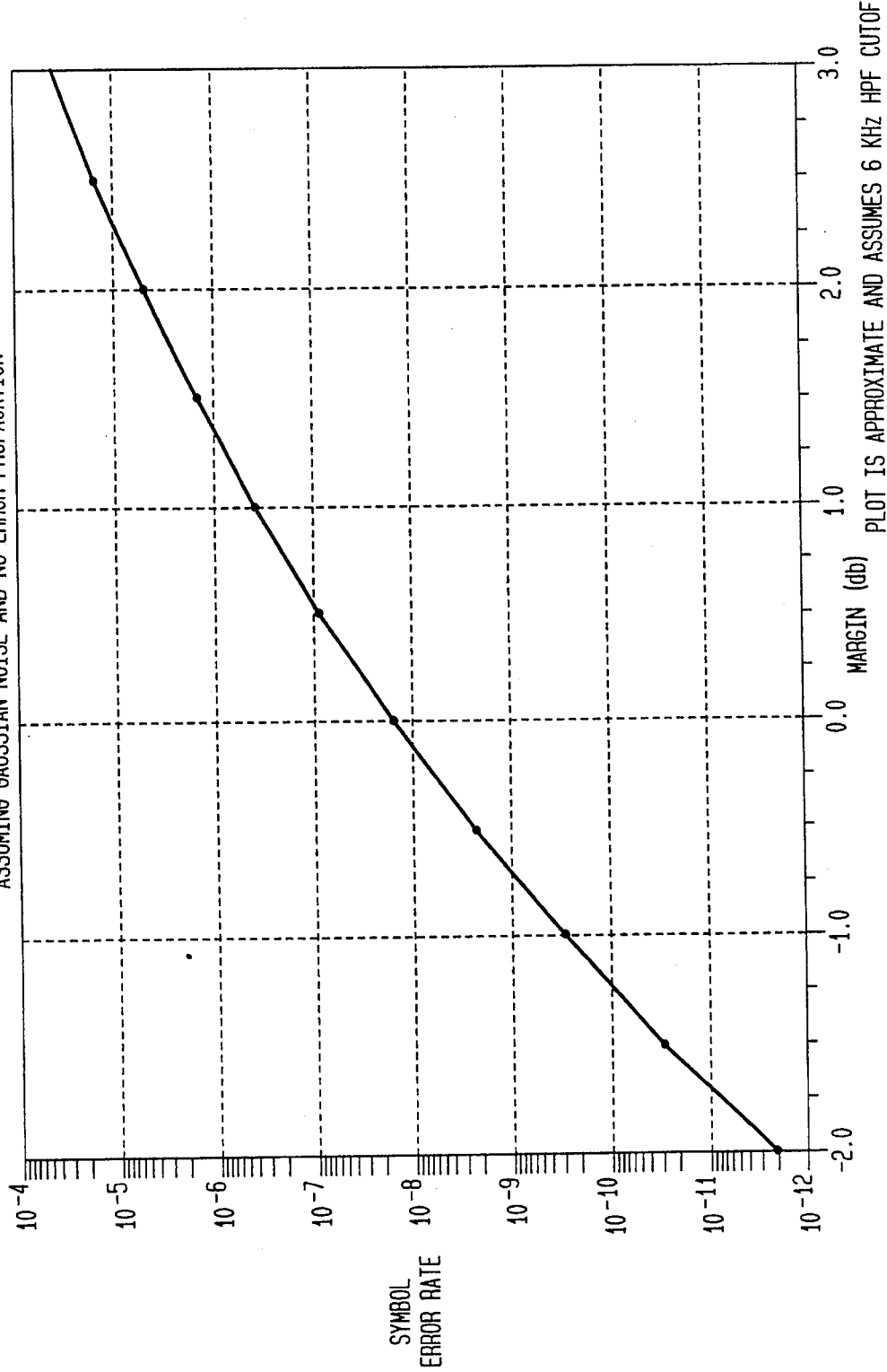

DECISION FEEDBACK EQUALIZER EMPLOYING FIXED RATIO POSTCURSOR TAPS FOR MINIMIZING NOISE AND INTERSYMBOL INTERFERENCE IN SIGNALS CONVEYED OVER HIGH SPEED DATA SERVICE LOOP

This is a continuation of application Ser. No. 08/170,733, issued Dec. 20, 1993, now U.S. Pat. No. 5,414,733, issued May 9, 1995.

FIELD OF THE INVENTION

The present invention relates in general to digital data communication systems, and is particularly directed to an improved decision feedback equalizer, which employs a prescribed number of postcursor taps that are a fixed ratio of the cursor tap, for minimizing noise and intersymbol interference in signals conveyed over a high speed data service loop (HDSL).

BACKGROUND OF THE INVENTION

A problem frequently encountered in (full duplex) digital data communication systems that employ a limited bandwidth channel is the presence of linear distortion introduced into the signal propagation path, which may manifest itself as intersymbol interference (ISI) in the received symbol sequence. In order to reduce the effects of this distortion, it is common practice to process the received signals by some form of transversal filter mechanism, such as a decision feedback (DFB) equalizer, an 'ideal' classical example of which is diagrammatically illustrated in FIG. 1.

As shown in FIG. 1, the front end of the DFB equalizer, to which the received symbol (plus noise) stream is applied, typically contains a noise-whitening filter 7 which is operative to "whiten" the noise spectrum present in the incoming signal sequence and to reshape the received signal. This filtered signal is then applied to an analog matched filter 8 that is matched to the reshaped signal spectrum. By 'matched' filter is meant that the signal is sampled (T) once per symbol, at an optimum sampling time.

The samples are then fed to a T-spaced feedforward linear filter section 11. T-spaced feedforward linear filter comprises a delay line 12, each $z^{-1}$ stage of which stores a respective symbol sample. The contents of the respective stages of the delay line are multiplied in multipliers 13 by respective weighting coefficients $W_i$ and then summed in adder 14, to produce a combined output for application to a downstream decision feedback section 15, from which output data decisions are derived on output link 17.

Specifically, the output of adder 14 is adjusted at 16 by subtracting the output of decision feedback section 15 from the output of adder 14. The effect of subtracting the output of the decision feedback section 15 from the linear filtered section 11 is to remove intersymbol interference due to previously detected symbols. Data decision estimates are derived on a symbol by symbol basis, by means of a symbol decision mechanism, such as a symbol slicer 18. Symbol slicer 18 slices the signal at levels equally spaced between reference levels for received symbols. These output data decisions are then fed back to a linear delay line 21 to remove intersymbol interference from future symbols. Like delay line 12, the contents of the respective $z^{-1}$ stages of delay line 21 are multiplied in multipliers 23 by respective weighting coefficients and then summed in an adder 24 to produce a combined output to be subtracted from the output of feedforward section 11.

A residual error signal (not shown) for adjusting the weighting coefficients of the linear section 11 and the decision feedback section 15 of the filter may be obtained by differentially combining data decision estimates at the output 17 with the output of summation block 16.

In the ideal conventional DFB equalizer architecture of FIG. 1, the weighting coefficients $W_i$ for the feedforward filter section 11 are assumed to be one-sided or "anticausal" and the last, or most delayed, tap $z^{-1}$ of delay line 12 is typically the largest, and is commonly referred to as the 'main' tap, the 'reference' tap, or the 'cursor' tap. The current decision on the value of a received symbol is customarily considered to have its dominant energy contribution derived through this tap. The weighting taps of the feedback section 15 take on values equal to samples of the postcursor or 'tail' of the received symbol which follows as the symbol energy decays.

Because the classical DFB structure assumes that the number of taps or stages is infinite, practical realization requires truncating the lengths of the respective feedforward and feedback delay lines at some practical number of taps per filter. In order to prevent significant degradation of the signal, the number of taps selected for the feedback stage 15 must be sufficient to span all significant samples of the signal at the point of ISI cancellation. The number of taps of the upstream stage 11 is not as readily apparent. Although this number is related to the precursors, it is not necessarily equal to the significant energy span of the precursors.

one method to establish the length of the filter is to either compute the coefficients or simulate the filter with a large number of coefficients and determine how many are significant. However, this approach is heavily channel dependent. Since, in practice, the signal processing circuit designer does not have the freedom to implement a "whitened" matched filter in the analog domain prior to sampling, which would be different for every line shape and noise spectrum, some prescribed fixed shaped is employed, or a simple anti-aliasing filter may be used upstream of the sampling point.

FIG. 2 diagrammatically illustrates an example of a practical implementation of the above described classical DFB equalizer structure, in which the linear feedforward section 11 has a finite number M of delay line stages $z^-$ and feedback section 15 has a finite number N of delay line stages $z^{-1}$. The received symbol sequence (and any accompanying noise) is filtered in a fixed analog filter 31, which is operative to band-limit the signal prior to sampling at 32. The shape of filter 31 may be such that it rolls off and partially whitens the noise component; it is normally not adaptive and cannot behave as a matched filter because the channel characteristics are unknown. A matched filter must have a prescribed amplitude and phase characteristic, and its implementation may be complex particularly in the analog domain for an arbitrary channel shape, even if such shape were known.

In order to train the adaptive equalizer, data values or symbols corresponding to the transmitted data are used. Training is normally carried out using a predetermined training sequence. Alternatively, if the data decisions are sufficiently reliable prior to convergence, these data decisions can be used for training. When a training sequence is employed it is common practice to derive a rough approximation of the amount of delay and allow the taps to grow until the largest tap is identified. Then the amount of delay is adjusted so as to place the cursor tap at the desired location which, as noted above, is the last stage of the feedforward delay line 12.

An alternative approach to implementing the 'classic' DFB equalizer of FIG. 1, diagrammatically illustrated in FIG. 3, involves a 'brute force' modification of the front end filtering structure associated with feedforward section 11. If sufficient information is known about the dispersive channel and noise content of the received signal, an adaptive whitened matched filter may be employed. In the environment of HDSL signals, the spectrum of the noise is often assumed to be known, and signal energy essentially vanishes above the Nyquist frequency, particularly on long lines. Given this information, a 'fixed' noise-whitening filter mechanism, shown at 35 in FIG. 3, may be inserted in the feedforward signal flow path, downstream of the sampling point.

The sampling rate may be one sample per symbol time (T-spaced sampling), since for long loops there is very little signal energy received at the upper edge of the band. It may be inferred that only a small amount of signal energy will be aliased from the range of frequencies greater than half the symbol rate. If so, and the "folded" spectrum consists essentially of only the original frequency component prior to folding (sampling), then an adaptive matched filter may be reasonably well synthesized after sampling. An analog matched filter is capable of operating on the entire frequency spectrum prior to folding; however, if there is no energy above the Nyquist sampling rate available at the receiver to fold or to be utilized during detection, then the matched filter may be more readily implemented as a digital filter downstream of sampling, as shown at 37. It should be observed, however, that noise is present at the higher frequencies. As a consequence, to limit noise, a well behaved anti-aliasing filter 39 is required. In the filter architecture of FIG. 3, the fixed noise-whitening filter 35 need not be adaptive if the input noise shape is well defined, such as is the case for current Bellcore standards.

As noted above, the output of noise-whitening filter 35 is coupled to adaptive matched filter 37, which is matched to the signal after whitening; and the filtered signal is then applied to the feedforward stage of the DFB equalizer. The length of the linear filter 12 in the feedforward section 11 will depend upon how many taps are required to eliminate all the (substantial) precursor content that has been injected into the signal by the matched filter. Since an accurate matched filter will generate precursors as long as the postcursors, which is on the order of a hundred or so samples for long HDSL loops, even prior to matched filtering, it can be expected that a long feedforward filter will be required.

Unfortunately, in the alternative filter architecture of FIG. 3, the addition of noise-whitening filter 35 and adaptive matched filter 37 (the length of which must be on the order of the tails or postcursors of the received symbols), and the considerable length of feedforward filter stage 11 creates a complex digital implementation problem.

SUMMARY OF THE INVENTION

Careful scrutiny of the functionality of the front end filter components of the above-described 'brute force' filter approach of FIG. 3 reveals that the cascade of the noise-whitening filter 35, the matched filter 37 and the anticausal feedforward filter section 11 are all linear processing elements, so that they are potentially combinable by convolution into a single linear filter architecture with the same performance. If this combination is effected for typical communication lines and their corresponding adaptive filters, then the linear processing functionality corresponding to the cascaded set is no longer anticausal, but rather has coefficient values that grow to a peak and then decay. Placing a simple anti-aliasing filter (rather than a matched filter) upstream of the T-spaced sampling point will result in an optimum feedforward filter configuration that is not anticausal.

Pursuant to a first embodiment of the invention, the feedforward filter section of the DFB equalizer is modified to include one or more taps that follow, or are located downstream of, the main or cursor tap, namely corresponding to locations on the postcursor tail of a received symbol pulse currently being detected. Specifically, the present invention involves the incorporation of an additional number K of such postcursor taps in the linear feedforward filter section (where K is an integer equal to or greater than 1), such that this filter section has its largest valued, or 'cursor' weighting coefficient associated with an M-Kth symbol stage of the multistage delay line, and K postcursor weighting coefficients associated with the last K symbol stages of the multistage delay line. Moreover, the postcursor weighting coefficient values associated with the last K symbol stages of the feedforward stage delay line are set at fixed fractions of the cursor weighting coefficient associated with the M-Kth received symbol stage of the delay line.

For example, the postcursor weighting coefficient values associated with the last K stages of the feedforward delay line are progressively decreasing binary fractions of the cursor weighting coefficient. Based upon empirical analysis, K may equal four, as a non-limiting example.

In accordance with the above-described embodiment of the DFB equalizer architecture of the invention, it is assumed that any interference arising from 'precursors' must be processed by linear filtering. An alternative approach, in accordance with a second embodiment of the invention, involves estimating the interference due to precursors and eliminating the interference by subtraction. In the case of a high speed data service loop, there is normally only a single precursor, so that each data decision is delayed by one symbol sample. Using information derived for the most recent sample estimate precursor interference, interference is removed prior to performing the decision slice operation. The signal processing mechanism of second embodiment of the invention involves coupling the output of the feedforward stage adder to a precursor estimate unit which forms an estimate of the scale factor relating the precursor sample to the peak sample.

In the precursor estimate unit, the precursor symbol is equalized and scaled, and its intersymbol interference contribution is removed from the current sample by subtraction. In order to perform equalization, the precursor estimate unit requires the value of the current decision. Since this information is not yet available, each of the possible decision values for the symbol of interest is considered. For each of these potential values, the precursor symbol is provisionally equalized and scaled by the weighting coefficient associated with the precursor. It is then subtracted from the signal path. Since plural potential symbol values are involved, the process is conducted for each potential symbol value. That symbol value that produces the lowest or minimum error is accepted as the correct value. As an alternative architecture, the precursor estimate itself may be sliced, so as to produce a tentative precursor decision for use in precursor cancellation.

In accordance with a further embodiment of the postcursor tap filter architecture of the invention, an adaptive noise canceler is coupled in the DFB path. The adaptive noise canceler includes a difference unit to which data decisions and decision feedback differences are applied. The output of the difference unit is the noise error, which is applied to a noise prediction unit which predicts the noise in the symbol. The predicted noise component is subtracted out from the input to the data slicer.

In addition to the foregoing embodiments involving T-spaced samples (one sample per symbol), the present invention is also applicable to fractionally spaced samples (multiple samples per symbol, or T/L) which in some instances may be preferred over T-spaced equalizers, in that fractionally spaced equalizers are almost completely insensitive to timing phase. The equalizer will adaptively interpolate the samples to operate as though the signal had been sampled at optimum sampling times. In addition, fractionally spaced equalizers have sufficient degrees of freedom to adaptively implement in one filter structure the cascaded of the optimum matched filter with the optimum linear structure for minimizing intersymbol interference. As a consequence, criticality in the design of an analog matched front end filter is eliminated. What is required is an anti-aliasing filter, which is considerably easier to implement at the increased sampling rate. Advantage may be taken of linear equalizer properties in a DFB structure incorporating fractionally spaced samples. Since outputs for decisions are needed only once per symbol, the decision feedback section can remain T-spaced.

The parameters of the DFB architecture of the present invention may be optimized in a relatively straightforward manner, using standard formulas as a starting point for the update gains on both the linear feedforward and DFB equalizer sections. The gain values are reduced to ensure stable initial operation. The noise canceler update gains may be chosen to be approximately comparable to the equalizer update gains. Additional factors are involved in the optimization of parameters such as the choice of postcursor coefficient values in the delay line structures with postcursor taps, the choice of precursor gain in the structure with precursor cancellation, and the number of taps used in the noise canceler structures.

Precursor gain may be based on maximizing signal-to-noise ratio at the slicer. For the noise canceler embodiment, it has been concluded that a set of four taps is optimum. In optimizing the postcursor tap coefficients it has been experimentally verified, through trial and error analysis, that the postcursor taps may comprise a relatively simple set of four taps having coefficient values of successively smaller binary fractions of the cursor tap. Computer simulations have revealed that the embodiment employing a combination of a set of four postcursor taps (progressively binary-scaled to the cursor tap) and a noise canceler offers the most substantial improvement over conventional equalizer structures.

BRIEF DESCRIPTION OF THE DRAWINGS

FIGS. 14 and 15 graphically illustrate the results of computer simulations showing the performance of the DFB equalizer of the present invention; and FIG. 16 shows the analytically derived symbol error rate versus performance margin for an ideal DFB, given prescribed assumptions.

DETAILED DESCRIPTION

Figure 1:
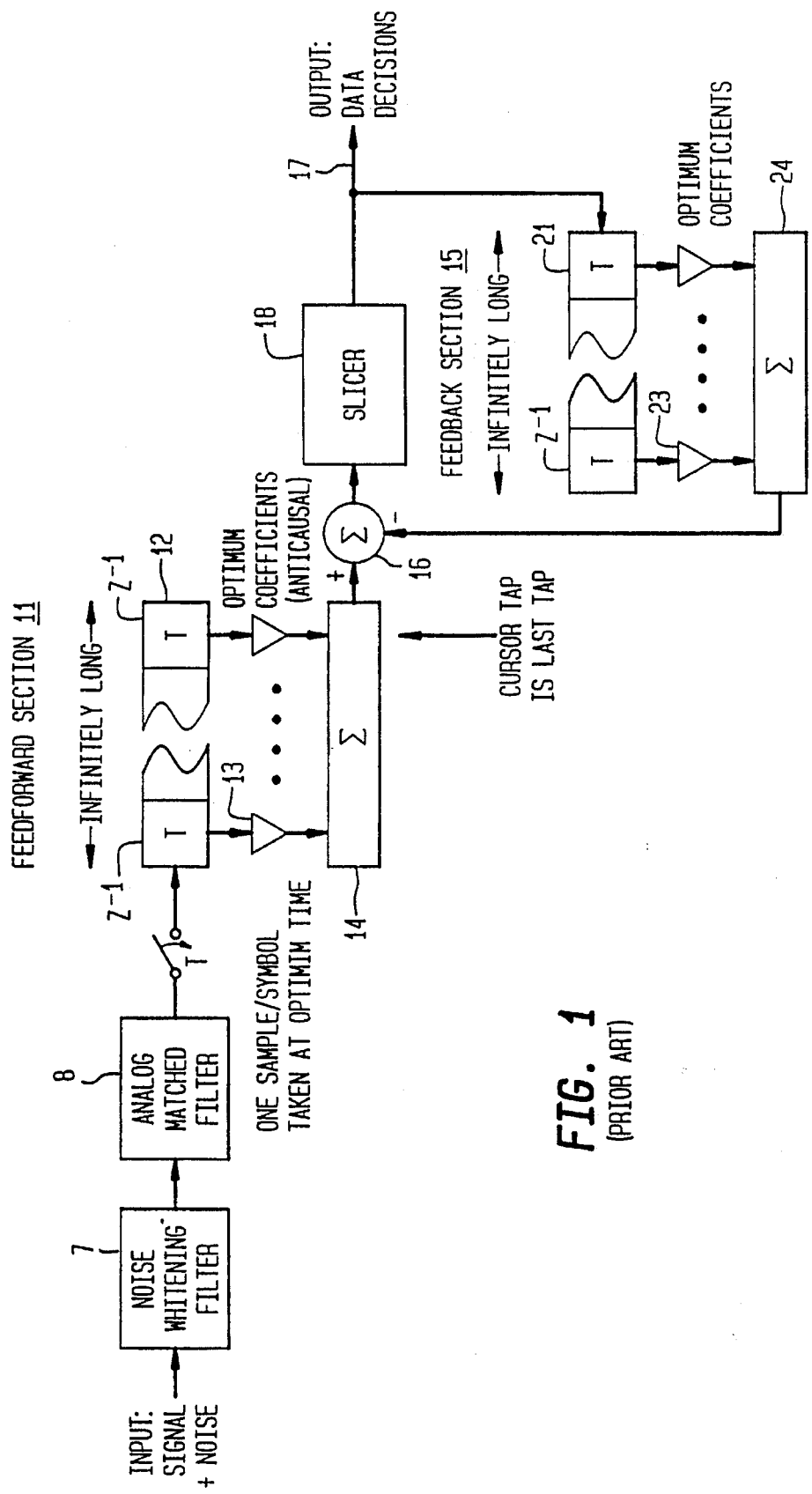
FIG. 1 diagrammatically illustrates the architecture of a classic 'ideal' decision feedback (DFB) equalizer.

Before describing in detail the particular improved decision feedback equalizer architecture in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

As noted previously, the present invention involves the incorporation of an additional number K of postcursor taps in the linear transversal filter section of a decision feedback equalizer, such that the feedforward filter section has its largest valued, cursor weighting coefficient associated with an M-Kth symbol stage of the multistage delay line, where K is an integer equal to or greater than 1, and K postcursor weighting coefficients associated with the last K symbol stages of the multistage delay line.

Figure 4:
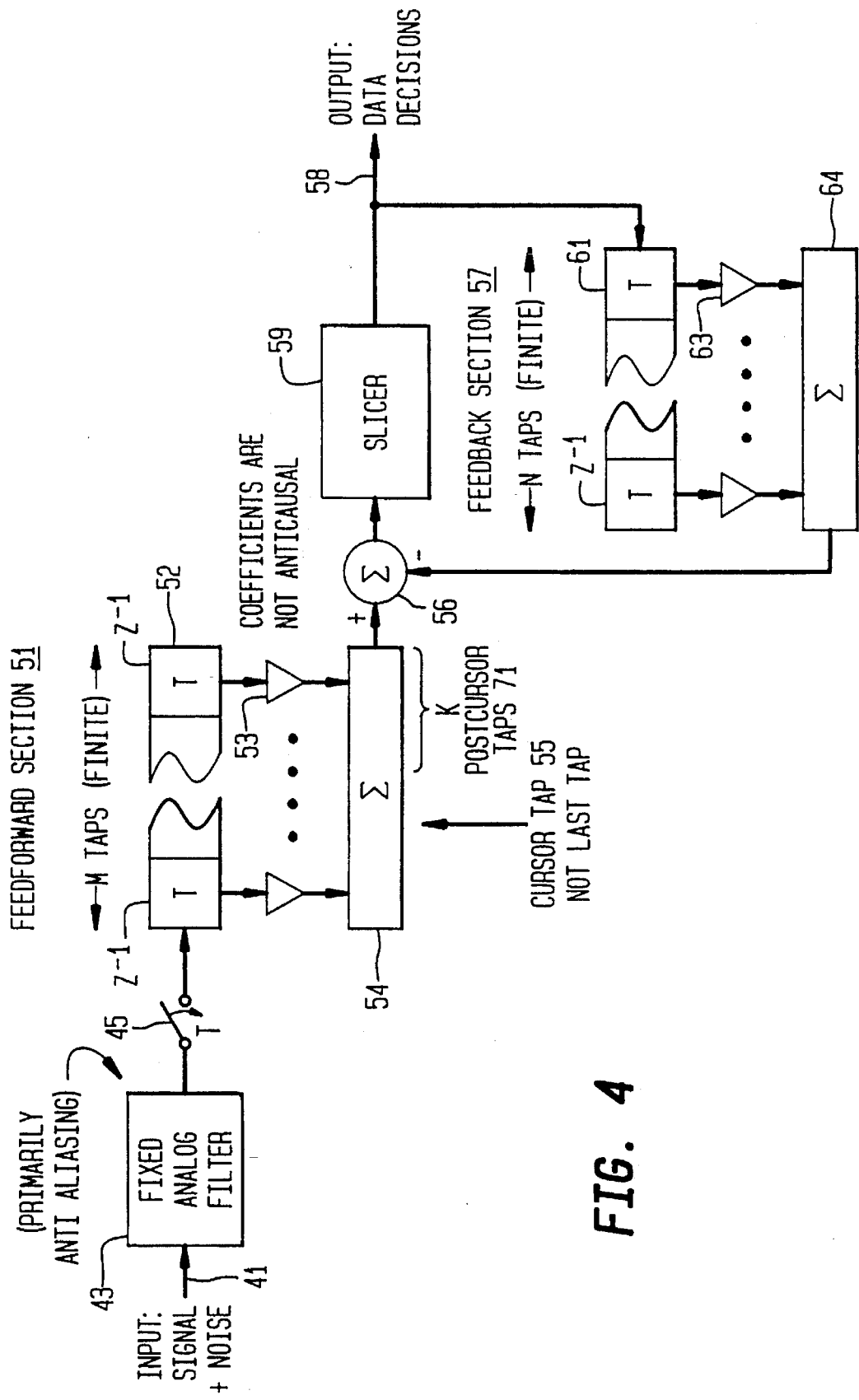
FIG. 4 diagrammatically illustrates a postcursor tap augmented DFB architecture in accordance with a first embodiment of the invention.

Such a postcursor tap augmented DFB architecture is diagrammatically illustrated in FIG. 4 as comprising an input port 41 to which a fixed analog anti-aliasing filter 43 is coupled. The filtered signal is sampled at 45 and the (T-spaced) sampled sequence is coupled to (T-spaced) linear feedforward filter section 51. T-spaced feedforward linear filter section 51 comprises an M-stage delay line 52, each $z^{-1}$ stage of which stores a respective symbol sample. The contents of the respective stages $z^{-1}$ of delay line 52 are multiplied in multipliers 53 by respective weighting coefficients $W_i$ and then summed in adder 54 to produce a combined output for application to a downstream decision feedback section 57. As will be described below, the M weighting coefficients corresponding to tap multipliers 53 include a cursor tap 55 (having the largest 'cursor' tap value) which is displaced a prescribed number (K) of stages $z^{-1}$ upstream from the last stage of the delay line 51.

The output of adder 54 is adjusted at 56 by subtracting the output from a decision feedback filter section 57, from which output data decisions are derived on output link 58. As in the conventional DFB equalizer structure of FIG. 1, subtracting the output of the decision feedback section 57 from the linear filtered section 51 removes intersymbol interference due to previously detected symbols. Data decision estimates are derived on a symbol by symbol basis, by means of a symbol slicer 59. Symbol slicer 59 slices the signal at levels equally spaced between reference levels for received symbols.

These output data decisions are then fed back to an N-stage linear delay line 61 of the feedback section 57 to remove intersymbol interference from future symbols. The contents of the respective stages of feedback delay line 61 are multiplied in multipliers 63 by respective weighting coefficients and then summed in an adder 64 to produce a combined output to be subtracted from the output of feedforward section 51.

Figure 2:
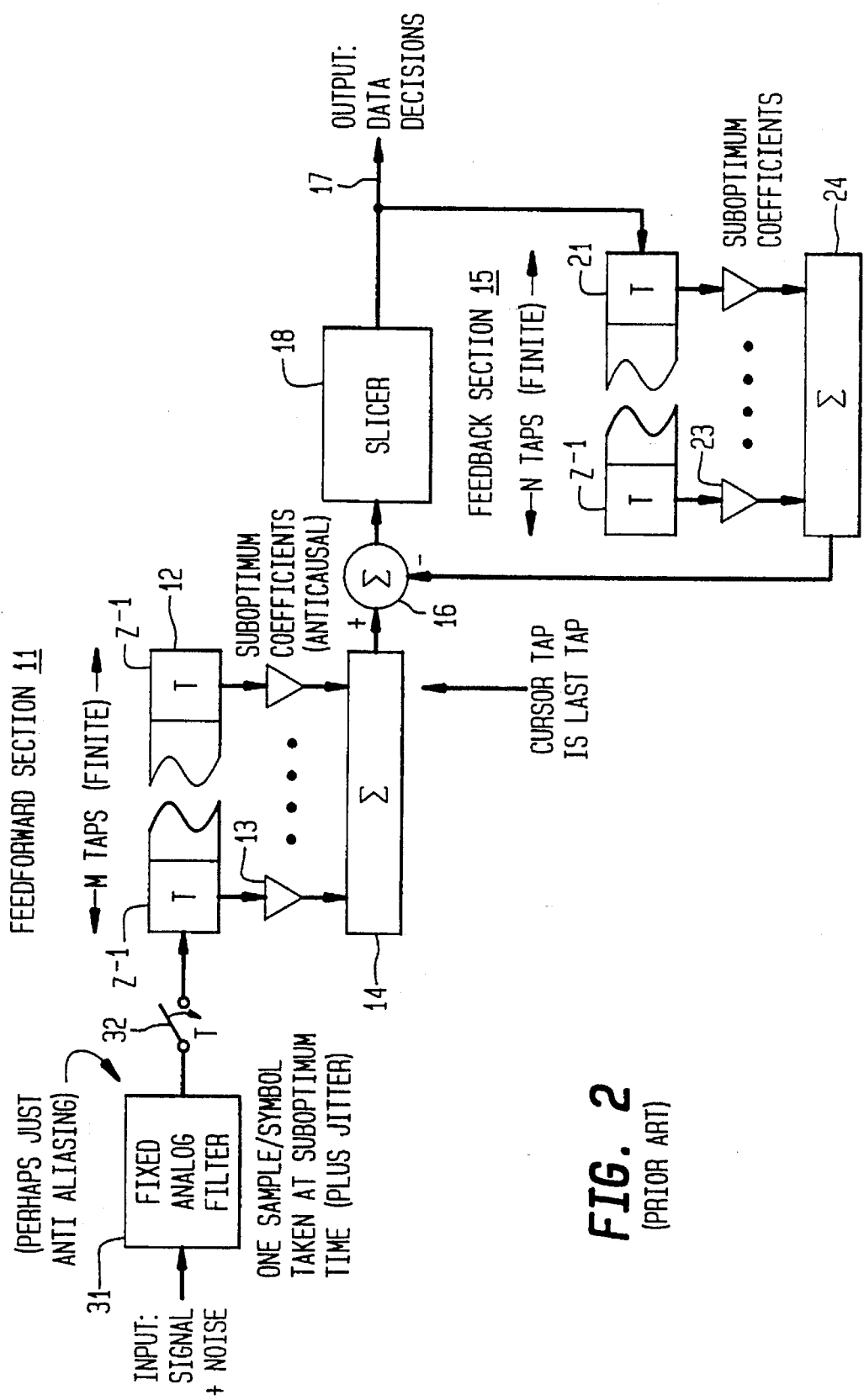
FIG. 2 diagrammatically illustrates an example of a practical implementation of a DFB equalizer structure, in which each of the feedforward and feedback sections has a respective finite number of delay stages.
Figure 3:
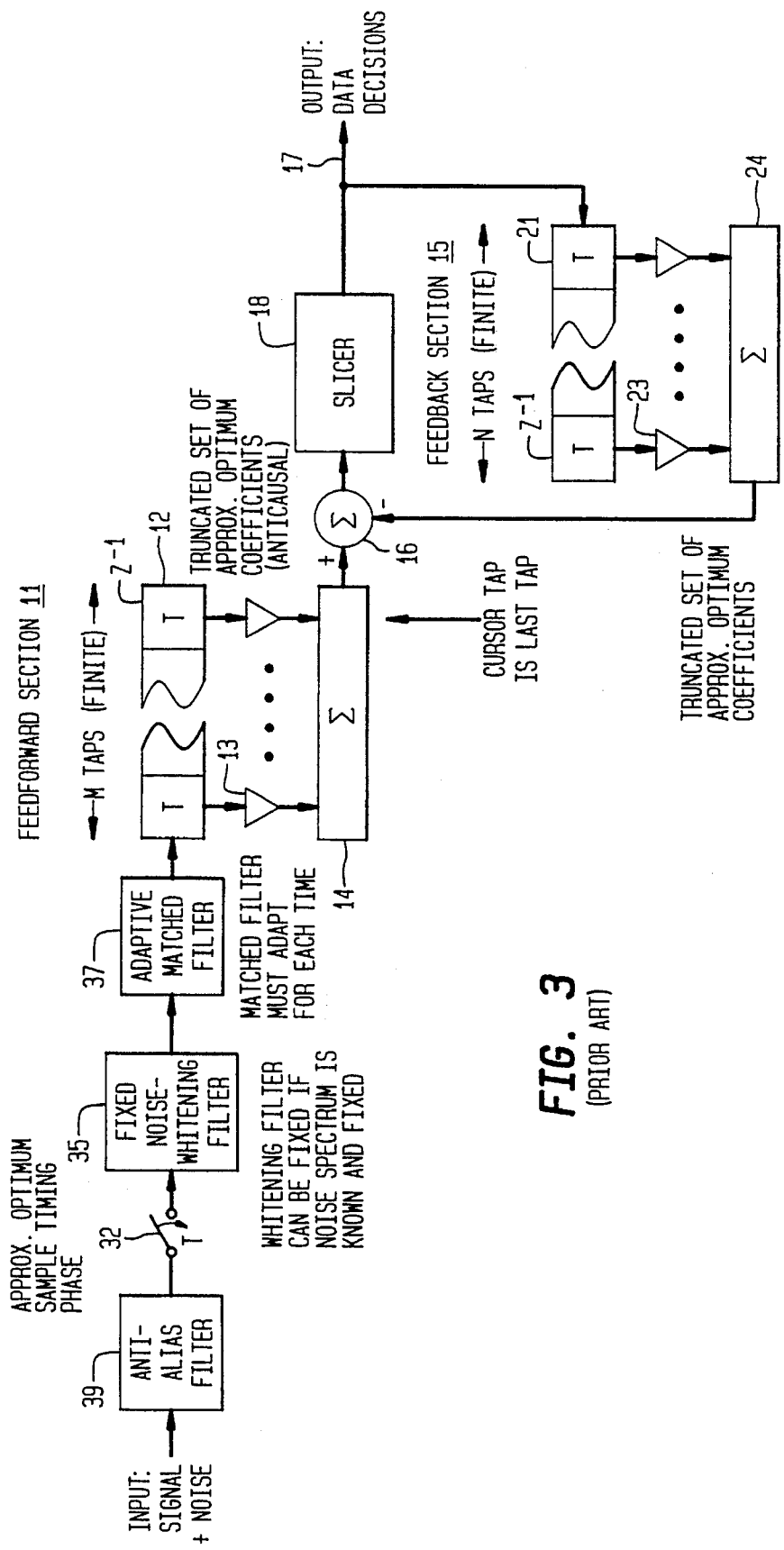
FIG. 3 diagrammatically illustrates an alternative approach to implementing the classical decision feedback equalizer of FIG. 2, having a modification of the front end filtering structure associated with feedforward section.

From a comparison of FIG. 4 with FIGS. 1–3, it can be seen that the DFB equalizer architecture of FIG. 4 differs from the structures described previously in that it includes a set of K postcursor taps 71 associated with the last K symbol stages of the feedforward stage delay line 52, located immediately downstream from cursor tap 55. Performance measurements have revealed that the K postcursor taps 71 do not readily adapt along with the other taps, and indeed appear to interact with the taps of the feedback section 57 (which operate on the same portion of intersymbol interference). As a result of experiments and analysis it has been determined that the coefficient values of the K postcursor taps 71 should be set at fixed fractions of the largest valued tap 55, namely, a fixed fraction of the cursor weighting coefficient $W_c$ associated with the M-Kth received symbol stage of the delay line.

For example, the postcursor weighting coefficient values associated with the last K stages of the feedforward delay line may be progressively decreasing binary fractions of the cursor tap. As will be explained in detail below, it has been empirically determined that substantially improved performance is obtained for K equal four, with the taps respectively succeeding the cursor taps having weighting values of ½, ¼, ⅛ and ¹⁄₁₆ of the cursor tap.

In the embodiment of the DFB equalizer architecture of FIG. 4, which allows the receiver to eliminate postcursor intersymbol interference by estimating the ISI from previous decisions and subtracting out the interference, it is assumed that any interference arising from 'precursors' (namely energy arriving in advance of the main portion of the pulse) must be processed by linear filtering (the feedforward filter section). An alternative approach involves estimating the interference due to precursors and eliminating the interference by subtraction. This involves an uncertainty, since the filter does not know the value of the future symbol (a decision yet to be made).

Figure 5:
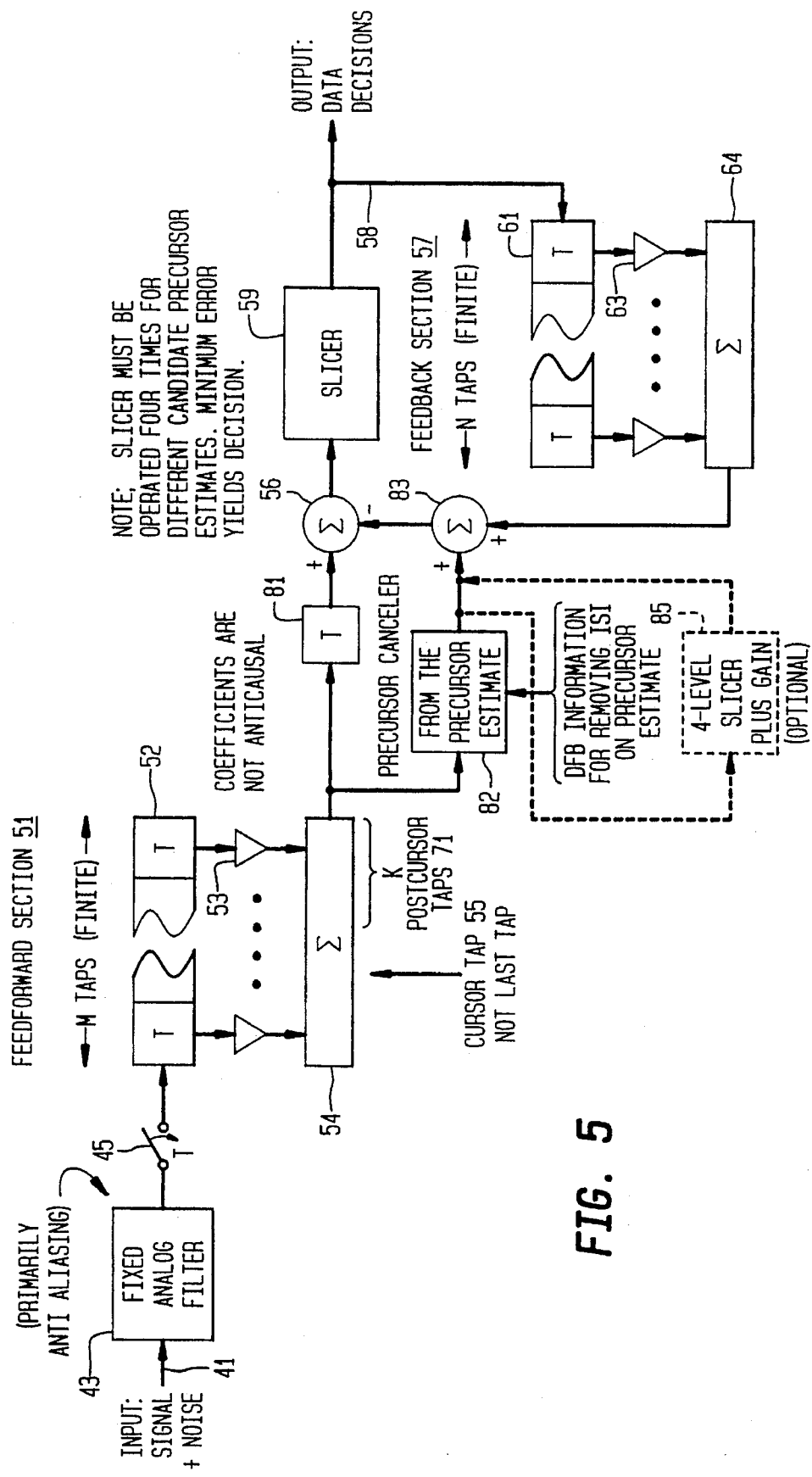
FIG. 5 diagrammatically illustrates a modification of the filter architecture of FIG. 4, which includes precursor cancellation.

FIG. 5 diagrammatically illustrates a modification of the filter architecture of FIG. 4, which although not strictly a DFB equalizer, includes processing for the purpose of precursor cancellation. As described above, since, for high speed data service loops, there is normally only a single precursor, each data decision is delayed by one symbol sample. For this purpose, the output of adder 54 is coupled to a single symbol delay stage 81. Using information derived for the most recent sample estimate precursor interference, interference is removed (subtracted) at 56 prior to performing the decision slice operation. The signal processing mechanism of the modification of FIG. 5 involves coupling the output of adder 54 to a precursor estimate unit 82 which is operative to form an estimate of the scale factor relating the precursor sample to the peak sample.

For this purpose, precursor estimate unit 82 may comprise an input sample taken from the output of adder 54 followed by combining (summing) of intersymbol interference in the form of the product of the first decision feedback tap weight 63 with potential decision values, the result of which is scaled to reflect the estimated or nominal precursor size and provided as an input to summing unit 83. In precursor estimate unit 82, the precursor symbol is equalized and scaled. Its associated intersymbol interference contribution is removed from the current sample by subtraction, as shown at 56.

In order to perform equalization, precursor estimate unit 82 requires the value of the current decision. Since this information is not yet available, each of the possible decision values for the symbol of interest is considered. (For an HDSL loop these values or $+1, +3, -3, -1$.) For each of these potential values, the precursor symbol is provisionally equalized and scaled by the weighting coefficient associated with the precursor. It is then subtracted at 56 from the signal path. Because four potential symbol values are involved this process is conducted for each potential symbol value. That symbol value that produces the lowest or minimum error is accepted as the correct value.

As an alternative architecture, the precursor estimate itself may be sliced, so as to produce a tentative precursor decision for use in precursor cancellation. For this purpose, a four level slicer, shown in broken lines 85 may be coupled in the output path of precursor formation unit 82. The output of the slice operation is then scaled by the precursor gain and subtracted at 56 from the signal path.

Figure 6:
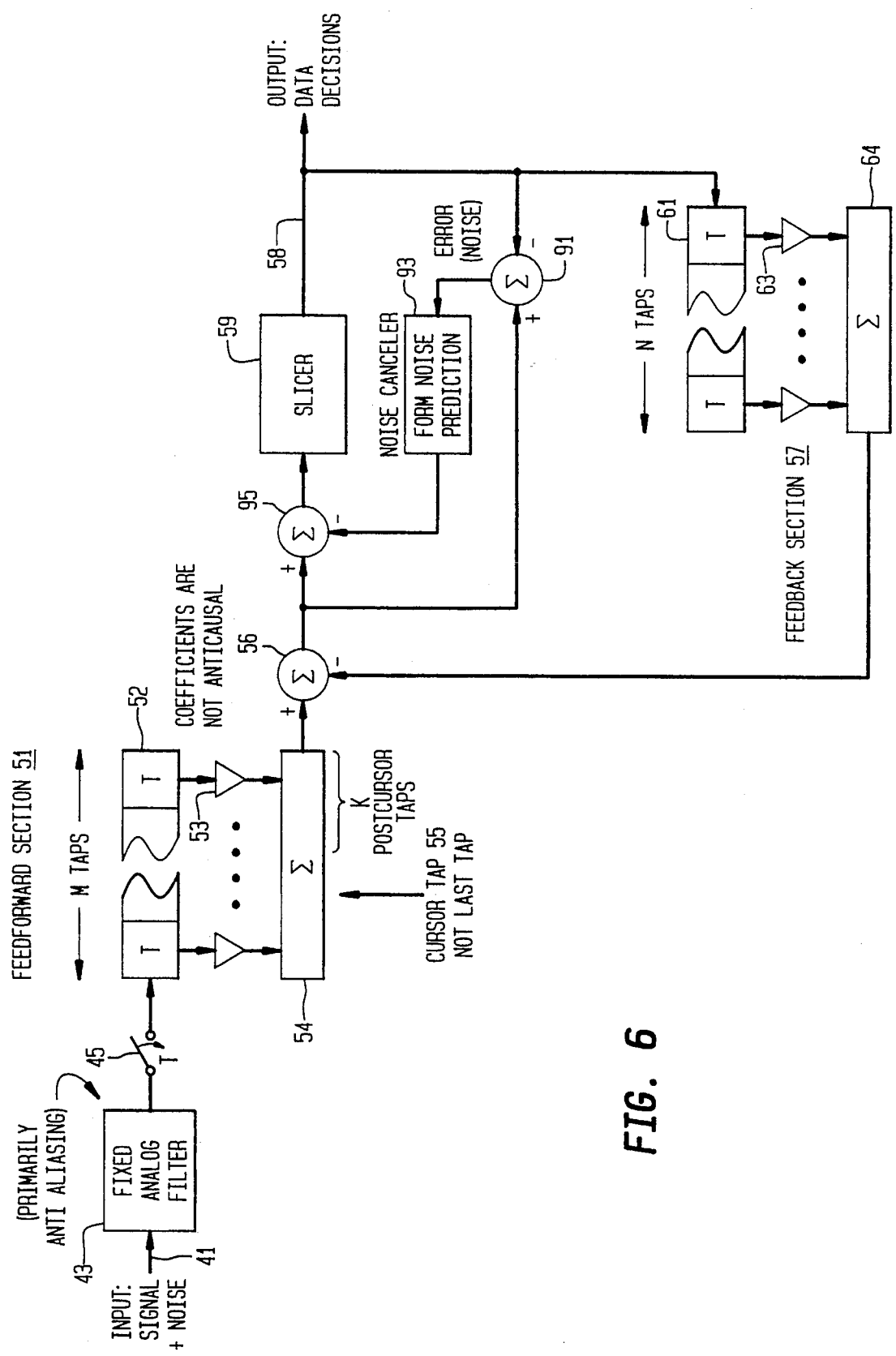
FIG. 6 diagrammatically illustrates a further modification of the postcursor tap filter architecture of FIG. 4, in which an adaptive noise canceler is coupled in the DFB path.

FIG. 6 diagrammatically illustrates a further modification of the postcursor tap filter architecture of FIG. 4, in which an adaptive noise canceler is coupled in the DFB path. Allowing the equalizer architecture of FIG. 4 to adapt until reaching approximately an optimum solution results in an error sequence which is the difference between the equalized samples applied to the slicer 59 and the sliced outputs (assuming correct data symbol decisions). If the spectrum of this error sequence is not completely flat (white noise), then there is a correlation of one error sample to the next. This correlation makes it possible to predict a given error sample from a history of previous error samples. By subtracting out whatever portion of the error is predicted, it is possible to reduce the total error.

For this purpose, the filter architecture of FIG. 6 further includes a difference unit 91 to which the output of difference unit 56 and the data decisions are applied. The output of difference unit 91 is the noise error, which is applied to noise prediction unit 93, which is operative to predict the noise in the symbol. For this purpose, noise prediction unit 93 preferably comprises a linear adaptive filter. The predicted noise component is supplied as one of the difference inputs to difference unit 95, which subtracts out the noise component from the input to the data slicer 59.

Although the foregoing embodiments of the invention have been described in the context of T-spaced samples (one sample per symbol), the present invention is also applicable to fractionally spaced samples (multiple samples per symbol, or T/L) which in some instances may be preferred over T-spaced equalizers, in that fractionally spaced equalizers are almost completely insensitive to timing phase (the signal may be sampled anywhere in the baud epoch, so long as there is no significant jitter). The equalizer will adaptively interpolate the samples to operate as though the signal had been sampled at optimum sampling times. In addition, fractionally spaced equalizers have sufficient degrees of freedom to adaptively implement in one filter structure the cascade of the optimum matched filter with the optimum linear structure for minimizing intersymbol interference. As a consequence, criticality in the design of an analog matched front end filter is eliminated. All that is effectively necessary is a satisfactorily performing anti-aliasing filter, which is considerably easier to implement at the increased sampling rate.

Figure 7:
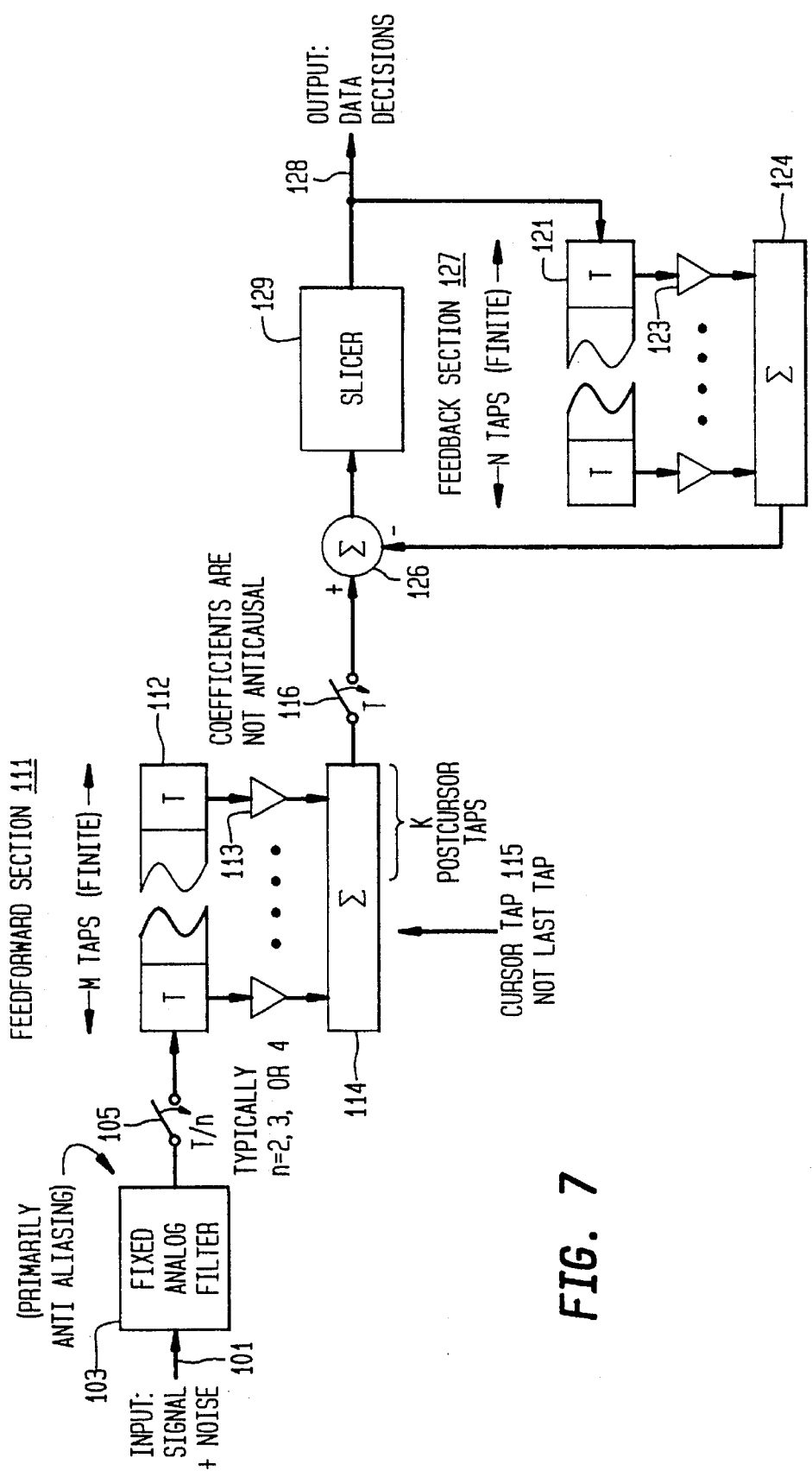
FIG. 7 diagrammatically shows a modification of the postcursor tap augmented DFB architecture of FIG. 4 for fractionally spaced samples.

Advantage may be taken of linear equalizer properties in a DFB structure incorporating fractionally spaced samples. Since outputs for decisions are needed only once per symbol, the feedback section can remain T-spaced. Such a structure is diagrammatically shown in FIG. 7 as comprising an input port 101, to which a fixed analog anti-aliasing filter 103 is coupled. The filtered signal is sampled at 105 and the (T/L-fractionally spaced, where L=2,3 or 4, for example) sampled sequence is coupled to (T/L-fractionally spaced) linear feedforward filter section 111. T/L-fractionally spaced feedforward linear filter section 111 comprises an M-stage delay line 112, each $z^{-1}$ stage of which stores a respective symbol sample. The contents of the respective stages $z^{-1}$ of delay line 112 are multiplied in multipliers 113 by respective weighting coefficients $W_i$ and then summed in adder 114, to produce a combined output for application to a downstream decision feedback section 127. As will be described below, the M weighting coefficients corresponding to tap-multipliers 113 include a cursor tap 115 (having the largest 'cursor' tap value) which is displaced a prescribed number (K) of stages $z^-$ upstream from the last stage of the delay line 111.

The output of adder 114 is sampled once per symbol by sampling element 116. The sample is adjusted at difference element 126 by subtracting the output from decision feedback section 127. From the output of difference element 26, data decisions are derived on output link 128. As in the conventional DFB equalizer structure of FIG. 4, subtracting the output of the decision feedback section 127 from the linear filtered section 111 removes intersymbol interference due to previously detected symbols. Data decision estimates are derived on a symbol by symbol basis, by means of a symbol slicer 129. Symbol slicer 129 slices the signal at levels equally spaced between reference levels for received symbols.

These output data decisions are then fed back to an N-stage linear delay line 121 of the feedback section 127 to remove intersymbol interference from future symbols. The contents of the respective stages of feedback delay line 121 are multiplied in multipliers 123 by respective weighting coefficients and then summed in an adder 124 to produce a combined output to be subtracted from the output of feedforward section 111.

It should be noted that using a fractionally spaced equalizer in a full duplex echo canceling architecture, such as an HDSL system, requires canceling echoes on many more samples, e.g. twice as many for T/2 spacing or three times as many for T/3 spacing, etc. Since the number of stages of which an echo canceler delay line is comprised (e.g. 128) is a driving parameter in the size of the system, it necessarily follows that there is a significant size and cost penalty for such an arrangement.

An alternative approach is to cancel the echoes subsequent to equalization. If this approach is chosen there are additional considerations, such as the need for more dynamic range deeper into the system, the ability to adapt the echo canceler rapidly enough to 'follow' the linear equalizer, if it precedes echo cancellation, stability issues, etc. Timing recovery is relatively straightforward and can be accomplished at approximately the optimum point in the symbols. It is well known that a T-spaced DFB equalizer is much less sensitive to timing phase than is a T-spaced linear equalizer.

Operational tests on the application to fractional spacing of the DFB equalizer of the present invention reveal a need to set the postcursor taps at a fixed fraction of the cursor tap. In the fractional spacing application, just as in the T-spaced structure of FIG. 4, described above, the postcursor taps do not readily converge, a problem which is overcome by the use of a set of taps whose values are fixed fractions of the cursor tap value. Where near end crosstalk (NEXT) is likely to be largely cyclostationary rather than stationary and Gaussian as in laboratory signal analysis, it has been determined that a fractionally spaced equalizer used in conjunction with a system having significant excess bandwidth provides a substantial amount of additional noise suppression (e.g. on the order of 6 dB).

Optimization of the parameters of the DFB architecture of the present invention is relatively straightforward. Standard formulas may be used as a starting point for the update gains on both the linear feedforward and DFB equalizer sections. The gain values should be reduced somewhat to ensure stable initial operation. After the taps converge, the gains may be further reduced. The noise canceler update gains may be chosen without significant optimization to be approximately comparable to the equalizer update gains.

Optimization of some of the parameters may employ additional criteria. Such parameters include the choice of postcursor coefficient values in the delay line structures with postcursor taps, the choice of precursor gain in the structure with precursor cancellation, and the number of taps used in the noise canceler structures. The precursor gain value may be based on maximizing signal-to-noise ratio at the slicer, although a direct error count optimization may also be used.

In the case of the noise canceler, a brief set of simulations was performed using a "best case" structure having four postcursor taps and no precursor canceler. Optimization was performed for an HDSL Loop 10 at 0 dB margin. The five following canceler lengths were tested: 0, 2, 4, 6, and 8 taps. The criterion used was maximization of signal-to-noise (SNR) ratio at the slicer. In this case, results subsequently derived from direct error counts have verified that essentially all of the SNR advantage predicted by the optimization was realized in a shift of the error curve. It has been concluded, therefore, that using SNR maximization is adequate for this purpose. (Although it is much simpler to optimize using SNR measurement, rather than an error count, this approach requires careful checking because it does not generally account properly for error propagation effects.)

Figure 8:
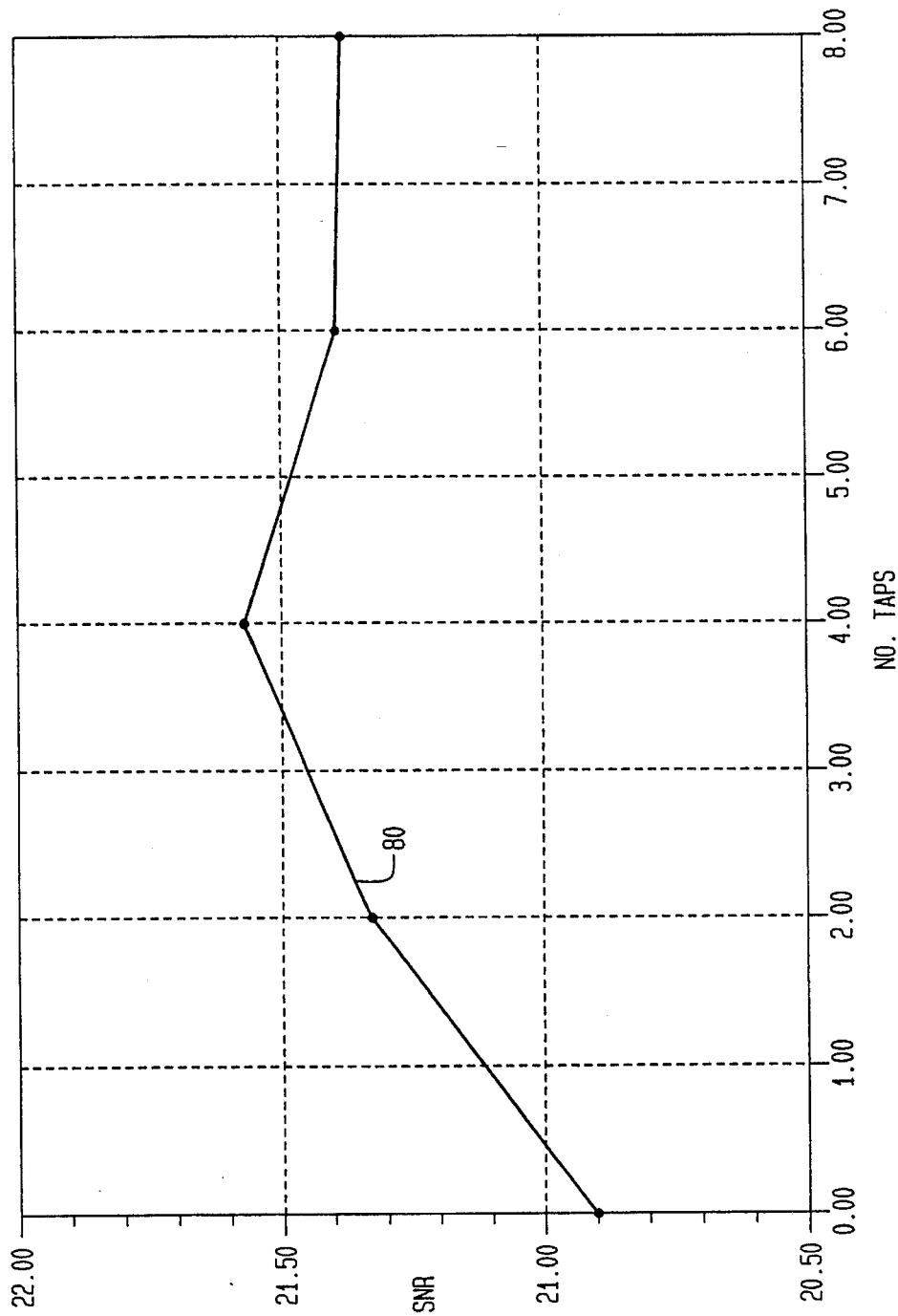
FIG. 8 graphically illustrates the results of a study of the optimization of the noise canceler length.

The results of a study of the optimization of the noise canceler length are graphically illustrated in FIG. 8. As shown by curve 80, slicer SNR grows as the number of noise canceler taps is increased to about four taps and then levels off. It may be concluded that increasing the number of taps greater than four does not significantly improve on the noise prediction and perhaps adds a small amount of noise due to imperfect adjustment.

Optimization of the postcursor tap coefficients initially involved using only one postcursor tap set equal to one half the cursor tap. It has been experimentally verified that this relatively simple approach provides a significant improvement in equalizer performance. Further investigations involve measurements using four and five postcursor taps. During system operation tap values were collected before any overflows due to tap wandering (deconvergence) occurred. The response associated with a finite impulse response filter for a white noise input indicated that the filter characteristic rolls off well at high frequencies to effectively whiten the noise.

Figure 9:
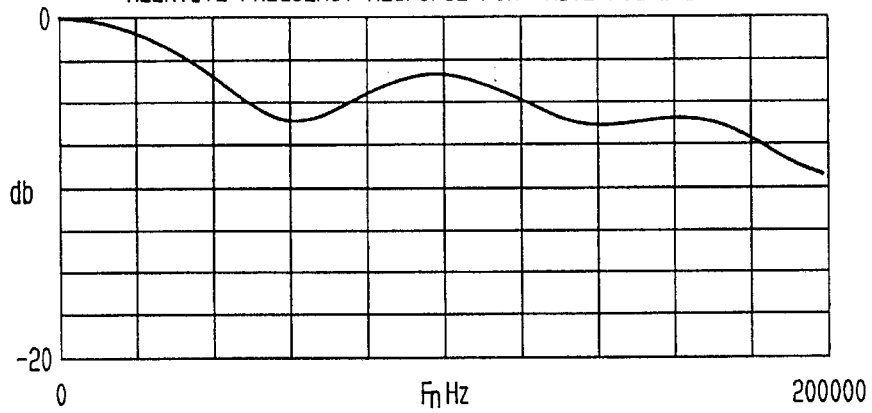
FIGS. 9–11, respectively, show experimentally measured responses of finite impulse response (FIR) filter coefficients for a white noise input, shaped noise (NEXT), and a noise spectrum corresponding to the application of NEXT signals through an adaptively obtained FIR filter.
Figure 10:
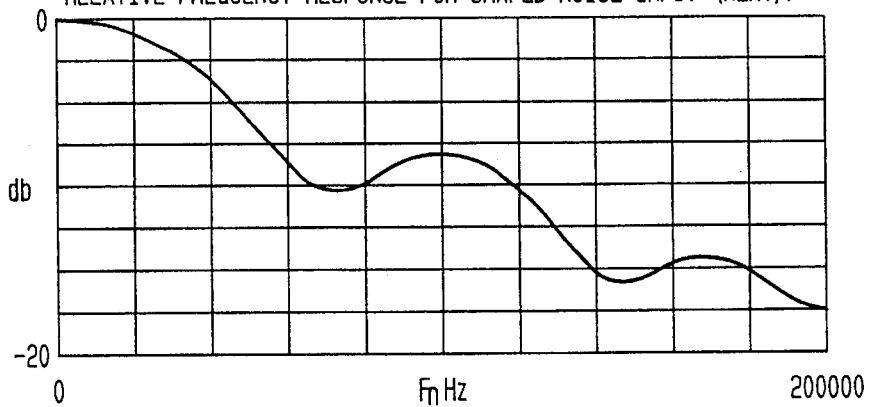
Figure 11:
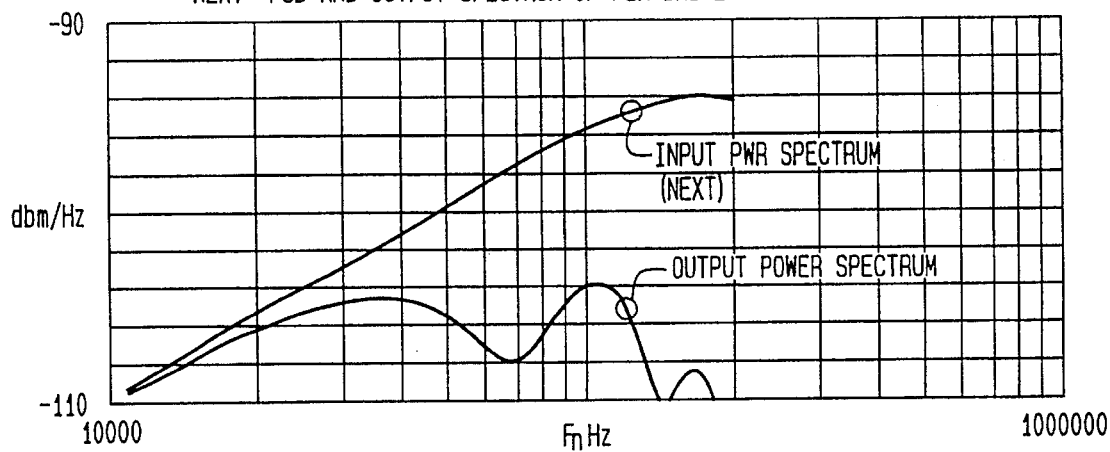

FIGS. 9–11, respectively, show experimentally measured responses of finite impulse response (FIR) filter coefficients for a white noise input, shaped noise (NEXT), and a noise spectrum corresponding to the application of NEXT signals through the FIR adaptively obtained in that environment. In FIG. 9 it can be seen that the filter response is relatively flat, so that a white noise input provides somewhat of a white noise output (even though there are a few dB of downward slope across the band.) The ripples are probably due to adaptation error and the fact that only four postcursor taps were employed to shape the spectrum.

In FIG. 10, it can be seen that when a NEXT signal source is driving the system, the FIR taps adjust to increasingly roll off the high noise region of the spectrum. The NEXT model has a slope of about 15 db per decade, which is similar to the roll-off of the adapted FIR filter in FIG. 11. In FIG. 11, the results of passing theoretical NEXT signals through the FIR are shown. It can be seen that the noise is approximately whitened by the tap values obtained from the adapted FIR.

In selecting a candidate set of taps for analysis, an objective was to determine a set that would approximately whiten noise generated by the NEXT signal model, and to afford flexibility in that it can be modified in processor software if needed. Hardware constraints have led to the use of four postcursor taps as a practical number. Through trial and error analysis of various tap values, a relatively simple set of coefficients, referenced previously, was selected. These values are binary fractions of the cursor tap and are equal to ½, ¼, ⅛, and ¹⁄₁₆ of the cursor.

Figure 12:
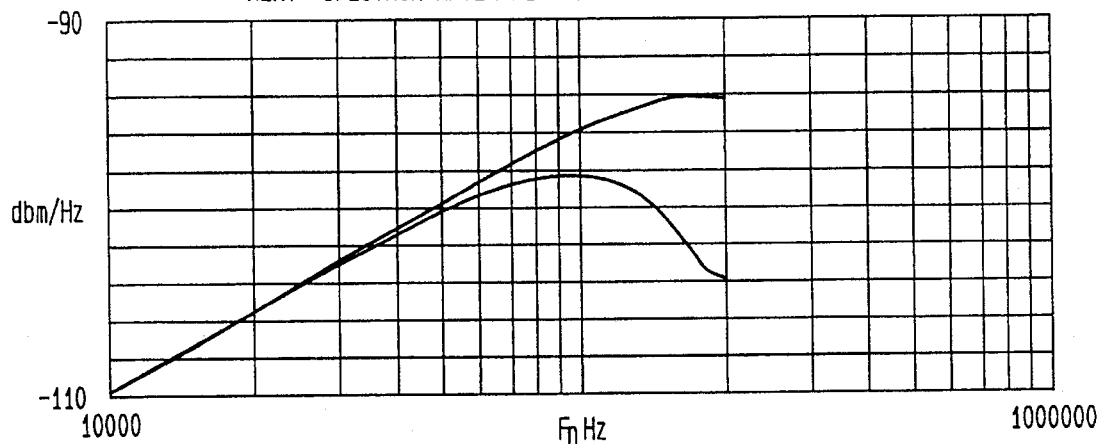
FIGS. 12 and 13 shows spectra of a NEXT signal model when passed through a pair of candidate postcursor tap sets.
Figure 13:
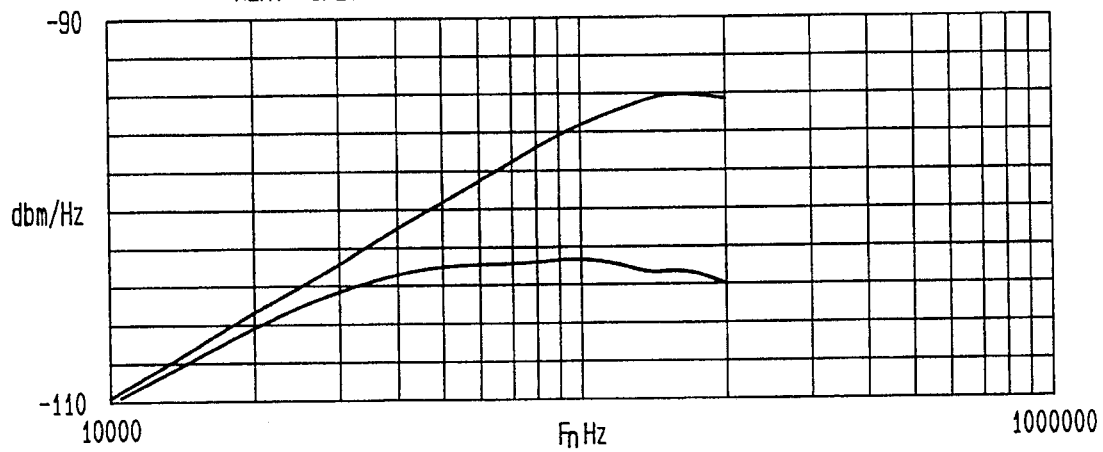

FIGS. 12 and 13 show spectra of a NEXT model when passed through a pair of candidate postcursor tap sets. Shown in FIG. 12 is the effect of using a single postcursor tap having a coefficient value equal to ½ the coefficient value of the cursor tap. FIG. 13 shows the effect of using four postcursor taps. It can be seen that a single tap dramatically rolls off noise at the high band edge and that a four tap set will approximately whiten noise without introducing any major ripples into the signal spectrum. These two candidates—a single postcursor tap and a set of four, were included in computer simulation results to be described below.

The results of computer simulations graphically illustrated in FIGS. 14 and 15 are associated with a Loop 10 link. The length (total number of taps/stages) of the DFB equalizer is 128 taps in all cases. The number of precursor taps in the feedforward filter is seven in all cases. With the cursor tap, this means the feedforward filter has a total of eight coefficients plus any postcursor taps used.

Since the purpose of the computer simulation was to study equalizer performance, most other variables were removed from the study. Both the echo and echo canceler were eliminated. (If the echo canceler is operating correctly, it should have no significant impact on the results.) Similarly, timing phase was set to a fixed phase that was experimentally found to be approximately optimum. The timing loop was frozen so no timing jitter was present. The timing loop operates on a signal taken from a point ahead of the equalization. Therefore, in a system with an operational timing loop there should be no interaction between the timing loop and any of these techniques, except that timing will degrade when errors are made. Each data point in the plots of FIGS. 14–15 was obtained by counting errors per 1,000,000 symbols. The sampling rate in the simulation is ten samples per symbol, in order to model all the wideband parts of the process properly (noise, analog filters, interpolation to mimic A/D sampling, etc.), corresponding to 10,000,000 samples for each data point.

With strictly linear receivers, it is usually possible to reasonably predict relative performance at one SNR by conducting measurements a dB or so noisier, where error rates are an order of magnitude or two higher. Unfortunately, with nonlinear processing, which generates bursts of errors, the projection from one SNR to another is less clear. It can be misleading to compare performance very far from where the performance is important. Bellcore has decreed that HDSL will be tested at an error rate on the order of $10^{-7}$. Therefore, long run times were required to even begin to approach the desired error rate.

Simulation results are summarized in the form of the raw data connected by straight lines in FIG. 14. The data can be seen to show some trends, but a much more attractive version of the plots can be obtained. By fitting an exponential model to the data for each structure, a straight line approximation can be obtained in the log-dB domain. Extrapolated, linear fits to the data are shown in FIG. 15. The theoretical ideal curve is derived from analysis where a smooth curve can be obtained using as many points as needed; therefore, the straight line model is not needed or used for that case. The curves of FIG. 15 (or 14) indicate a couple of dB or so difference between the worst simulated scheme and the best simulated scheme in the error range of $10^{-4}$ to $10^{-5}$. For the extrapolated trends shown, an improvement of 3 dB or more appears to be likely for a target error range of $10^{-7}$.

The error rate performance can be summarized as follows in the vicinity of $10^{-4}$ to $10^{-5}$. The poorest scheme tested was the conventional structure having no postcursor taps, precursor cancelers, or noise cancelers. Adding a single postcursor tap offers a dB or so of improvement. Using either four postcursor taps, as in the equalizer architecture of FIG. 4, or a noise canceler alone gives an additional half dB. The use of a precursor canceler (FIG. 5) appears to make little difference when added to a system with four postcursor taps—the precursor canceler was not tested with any of the other configurations.

The best performer was the system that used both four postcursor taps and the noise canceler embodiment diagrammatically illustrated in FIG. 6. This system looks about another half dB or more better than the nearest other results. Altogether, this indicates substantial improvement in the error rates can be achieved with these less conventional approaches.

It would appear that the difference between the schemes may increase as the error rate reduces toward a target value of $10^{-7}$. The ideal DFB curve is based on the assumption of an ideal DFB placed into a system that must deal with a specific HDSL channel model, transformer coupling model, and NEXT model. Namely, the simulation did not allow for a perfect (down to D.C.) transmitter coupling. Also, the calculations assume that no frequencies below 500 Hz are passed. Some of these assumptions must be made for the ideal model to get useful results. If perfect coupling is allowed at all frequencies, the ideal model will simply filter the signal to pass only energy at frequencies approaching 0 Hz, where noise goes to zero in the NEXT model. This yields an infinite signal to noise ratio, and the model will assume that an infinitely long DFB equalization can eliminate intersymbol interference, no matter how long the tails.

To avoid this singularity, a small but arbitrarily chosen amount of white noise may be included so that SNR cannot become infinite, even at DC. It would appear more reasonable to simply include a transmitter coupling model that rolls off signal power at the low frequencies, and disallow frequencies below some low point (e.g. 500 Hz) from participating in the analysis. The ideal curve also assumes no error propagation, which gives rise to a discrepancy between the hardware and the "ideal" model. For example, average error propagation length for the various simulated schemes varies over an order of magnitude or so, depending on the structure. For an average error multiplication of 10 (10 errors occurring for every burst that would be a single error without propagation), then the hardware structure will lose about a dB of margin performance over the ideal merely due to propagation.

From FIGS. 14 and 15 it may be concluded that the best architecture simulated is within a dB or so of the best hardware implementation of a DFB-like structure. It must be realized, however, that for a departure from the classical DFB structure by using precursor cancellation, or sequence estimation, the ideal DFB curve no longer applies and better performance might be achievable.

FIG. 16 extends the ideal DFB analysis over a wider range of margin and error rates. In this analysis and in all simulations, the transformer model was assumed to be a one-pole, high-pass filter with 3 dB frequency at 6 KHz. If this is reduced to 4 KHz, then all the curves should improve across the board by about 0.2 dB compared to the results shown.

As will be appreciated from the foregoing description, by modifying the feedforward filter section of a DFB equalizer to include one or more postcursor taps, that are sequentially weighted at decreasing binary fractions of the cursor tap, combined with the placement of a simple anti-aliasing filter upstream of the sampling point resulting in a feedforward filter configuration that is not anticausal, the present invention offers a substantially improved performance over conventional DFB equalizer structures. Optimum performance is achieved when such a postcursor filter structure is augmented with an adaptive noise canceler coupled in the DFB path.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A decision feedback equalizer comprising:

a linear transversal filter section to which successive received symbols of an input symbol sequence are sequentially introduced, said linear transversal filter section including a feedforward multistage delay line comprised of a sequence of M symbol value storage stages, and a feedforward weighting and summing stage operative to multiply symbols stored in respective storage stages of said feedforward multistage delay by respective ones of a plurality of M weighting coefficients, where M is an integer greater than one, and thereby obtain a plurality of M products, said M products being summed together to provide a weighted and summed feedforward symbol value output;

a symbol decision unit coupled to receive a differential symbol value associated with the difference between said weighted and summed feedforward symbol value output of said linear transversal filter section and a weighted and summed feedback symbol value output, and outputting a received symbol value estimate in accordance with said difference; and a decision feedback transversal filter section to which successive symbol value estimates generated by said symbol decision unit are sequentially applied, said decision feedback transversal filter section including a feedback multistage delay line comprised of a series of N symbol value storage stages, where N is an integer greater than one, and a feedback weighting and summing stage operative to multiply respective ones of N weighting coefficients by respective ones of N symbol decision outputs stored in said feedback multistage delay line, and thereby obtain a plurality of N products, said N products being summed to provide said weighted and summed feedback symbol value output, said weighted and summed feedback symbol value output being differentially combined with said weighted and summed feedforward symbol value output of said linear transversal filter section and the resulting differential signal being applied to said symbol decision unit which outputs received symbol value estimates; and wherein said feedforward weighting and summing stage of said linear transversal filter section has a largest valued, cursor weighting coefficient $W_c$ associated with an M-Kth symbol stage of said feedforward multistage delay line, where K is an integer equal to or greater than 1, and K respective postcursor weighting coefficients $W_{M-K+1}$ to $W_M$ associated with the last K symbol stages of said feedforward multistage delay line.

2. A decision feedback equalizer according to claim 1, wherein the postcursor weighting coefficient values associated with said last K stages of said feedforward multistage delay line are progressively decreasing binary fractions of said largest valued, cursor weighting coefficient $W_c$ associated with said M-Kth received symbol of said feedforward multistage delay line.

3. A decision feedback equalizer according to claim 1, wherein K equals four.

4. A decision feedback equalizer according to claim 1, further including an adaptive noise canceler coupled to receive said weighted and summed feedforward symbol value output and said received symbol value estimates, and being operative to modify said differential signal applied to said symbol decision unit in accordance with the difference between said weighted and summed feedforward symbol value output and said received symbol value estimates.

5. A decision feedback equalizer according to claim 4, wherein said adaptive noise canceler is operative to subtract said received symbol value estimates from said weighted and summed feedforward symbol value output to provide a noise error value, said noise error value being applied to a noise prediction operator, the output of which is subtracted from said differential signal to be applied to said symbol decision unit.

6. A decision feedback equalizer according to claim 1, further including a precursor estimate unit, coupled to said feedforward weighting and summing stage of said linear transversal filter section and said decision feedback transversal filter section, and being operative to form an estimate of a precursor symbol, and wherein said estimate of a precursor symbol is summed with the output of said feedback weighting and summing stage of said feedback transversal filter prior to being differentially combined with the feedforward weighted and summed symbol value output of said linear transversal filter section for application to said symbol decision unit.

7. A decision feedback equalizer according to claim 6, wherein said precursor estimate unit is operative to provisionally equalize and scale the output of said feedforward weighting and summing stage of said linear transversal filter section by the weighting coefficient associated with said precursor symbol.

8. A decision feedback equalizer according to claim 7, wherein said input symbol sequence is comprised of a plurality of respectively different symbols, and wherein said precursor estimate unit is operative to provisionally equalize and scale the output of said feedforward weighting and summing stage of said linear transversal filter section by respective weighting coefficients associated with each of said respectively different symbols, and wherein said decision feedback transversal filter section is operative to generate a received symbol value estimates as that symbol associated with the precursor estimate having minimum error.

9. A decision feedback equalizer according to claim 6, wherein said input symbol sequence is comprised of a plurality of respectively different symbols, and wherein said precursor estimate unit is operative to provisionally equalize and scale the output of said feedforward weighting and summing stage of said linear transversal filter section by respective weighting coefficients associated with each of said respectively different symbols, and further including a precursor symbol decision unit which is coupled to receive the equalized and scaled outputs of the weighting and summing stage of said linear transversal filter section and to generate a precursor estimate associated with one of said respectively different symbols, and wherein said precursor estimate is combined with said weighted and summed feedback output.

10. A decision feedback equalizer according to claim 1, wherein said linear transversal filter section is coupled to receive fractionally spaced samples of successive ones of said input symbol sequence.

* * * * *